US010408173B2

(12) United States Patent
Kaufmann et al.

(10) Patent No.: US 10,408,173 B2
(45) Date of Patent: Sep. 10, 2019

(54) FILTER ELEMENT

(71) Applicant: MANN+HUMMEL GMBH, Ludwigsburg (DE)

(72) Inventors: Michael Kaufmann, Meckenheim (DE); Klaus-Dieter Ruhland, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 437 days.

(21) Appl. No.: 14/993,352

(22) Filed: Jan. 12, 2016

(65) Prior Publication Data

US 2016/0201619 A1     Jul. 14, 2016

Related U.S. Application Data

(63) Continuation of application No. 14/178,601, filed on Feb. 12, 2014, now Pat. No. 9,233,333.

(Continued)

(30) Foreign Application Priority Data

Feb. 12, 2013 (DE) .................. 10 2013 002 274
Feb. 12, 2013 (DE) .................. 10 2013 002 275

(Continued)

(51) Int. Cl.
*B01D 46/00* (2006.01)
*F02M 35/02* (2006.01)
(Continued)

(52) U.S. Cl.
CPC ........... *F02M 35/084* (2013.01); *B01D 45/16* (2013.01); *B01D 46/0004* (2013.01);
(Continued)

(58) Field of Classification Search
CPC ........... B01D 46/0005; B01D 46/2411; B01D 46/2414; B01D 46/0004; B01D 46/008;
(Continued)

(56) References Cited

U.S. PATENT DOCUMENTS 6,090,177 A    7/2000    Moessinger et al.
6,419,718 B1 *   7/2002    Klug ................. B01D 46/0004
                                                      55/320

(Continued)

FOREIGN PATENT DOCUMENTS

DE          19829989 A1    1/2000
FR          1186929 A      9/1959
(Continued)

*Primary Examiner* — Robert Clemente
(74) *Attorney, Agent, or Firm* — James Hasselbeck

(57) ABSTRACT

A filter element has a filter body having a longitudinal axis and a concentric shape relative to the longitudinal axis. The filter body has a first end face and a second opposite end face. A first end disk is arranged at the first end face. A second end disk is arranged at the second end face. A support tube concentric to the longitudinal axis extends between the first and second end disks. At least one of the first and second end disks has support knobs arranged in a circular arrangement about the longitudinal axis and extending in axial direction outwardly. The support knobs, when the filter element is mounted in a housing that receives the filter element, rest against an inner cover contour of the housing and fold over in radial direction outwardly so as to be supported axially and radially on the housing.

17 Claims, 7 Drawing Sheets

Related U.S. Application Data

(60) Provisional application No. 61/815,214, filed on Apr. 23, 2013.

(30) Foreign Application Priority Data

| Feb. 12, 2013 | (DE) | ........................ | 10 2013 002 276 |
|---|---|---|---|
| Feb. 12, 2013 | (DE) | ........................ | 10 2013 002 277 |
| Feb. 12, 2013 | (DE) | ........................ | 10 2013 002 278 |

(51) Int. Cl.

| F02M 35/08 | (2006.01) |
|---|---|
| B01D 46/24 | (2006.01) |
| B01D 46/52 | (2006.01) |
| B01D 45/16 | (2006.01) |
| B01D 50/00 | (2006.01) |
| F02M 35/022 | (2006.01) |
| F02M 35/024 | (2006.01) |
| B01D 46/42 | (2006.01) |

(52) U.S. Cl.
CPC ....... *B01D 46/0005* (2013.01); *B01D 46/008* (2013.01); *B01D 46/0041* (2013.01); *B01D 46/2411* (2013.01); *B01D 46/2414* (2013.01); *B01D 46/4227* (2013.01); *B01D 46/523* (2013.01); *B01D 50/002* (2013.01); *F02M 35/0205* (2013.01); *F02M 35/0214* (2013.01); *F02M 35/0216* (2013.01); *F02M 35/0223* (2013.01); *F02M 35/0245* (2013.01); *F02M 35/02416* (2013.01); *F02M 35/02425* (2013.01); *F02M 35/02483* (2013.01); *F02M 35/08* (2013.01); *B01D 2265/021* (2013.01); *B01D 2265/06* (2013.01)

(58) Field of Classification Search
CPC ....... F02M 35/02416; F02M 35/02425; F02M 35/02483
See application file for complete search history.

(56) References Cited

U.S. PATENT DOCUMENTS

| 6,540,806 | B2 | 4/2003 | Reinhold |
| 6,602,308 | B1 | 8/2003 | Carle et al. |
| 6,652,614 | B2 | 11/2003 | Gieseke et al. |
| 6,706,087 | B1 | 3/2004 | Gebler et al. |
| 2002/0112459 | A1* | 8/2002 | Andress ............. B01D 46/0024 55/498 |
| 2010/0263339 | A1 | 10/2010 | Steins et al. |
| 2012/0324849 | A1 | 12/2012 | Ackermann et al. |
| 2013/0086877 | A1 | 4/2013 | Kori et al. |
| 2014/0102058 | A1 | 4/2014 | Kaufmann et al. |

FOREIGN PATENT DOCUMENTS

| GB | 1253354 A | 11/1971 |
| JP | H07119566 A | 5/1995 |
| JP | 2003138994 A | 5/2003 |

* cited by examiner

FILTER ELEMENT

CROSS-REFERENCE TO RELATED APPLICATIONS

This application is a Continuation of pending U.S. application Ser. No. 14/178,601 filed Feb. 12, 2014 and claims the benefit of U.S. Provisional Application No. 61/815,214 filed: Apr. 23, 2013, claims foreign priority under 35 USC 119(b) to prior filed German patent applications 10 2013 002 274.6 filed Feb. 12, 2013; 10 2013 002 275.4 filed Feb. 12, 2013; 10 2013 002 277.0 filed Feb. 12, 2013; 10 201 3 002 278.9 filed Feb. 12, 2013; and 10 2013 002 276.2 filed Feb. 12, 2013, the entire contents of U.S. application Ser. No. 14/178,601, the aforesaid U.S. Provisional Application and the aforesaid German patent applications being incorporated herein by reference.

BACKGROUND OF THE INVENTION

The invention concerns a filter element, in particular for use as an air filter of an internal combustion engine, as well as a filter system for installing such a filter element.

WO 2009/047196 A1 discloses a filter element in which it is ensured, by configuration of the seals of the filter element with two annular bead-shaped arrangements and a sealing groove positioned in between, that a sealing action, on the one hand, and an axial support of the filter element in a housing, on the other hand, can be achieved. Particularly when using plastic material for sealing on vibration-exposed elements, a design is required that works reliably even under extreme temperature fluctuations.

Furthermore, WO 2009/047196 A1 discloses a filter system with a filter element. This filter system serves in particular for filtration of the intake air of an internal combustion engine and is comprised of a housing and a cover for receiving the filter element. The filter system is provided with two annular grooves which communicate in the area of the sealing action with the sealing contours of the filter element.

Usually, the filter elements of air filters are exchanged after a certain operating time. Depending on the dust load, the service life of an air filter can be a few days (construction machinery) up to several months.

In particular in case of frequent exchange of filter elements, a reliable sealing action of the filter element in a housing is important for reliable operation. The sealing action should be temperature-resistant and vibration-resistant. Also, in devices or facilities that are exposed to strong vibrations or impacts, the sealing action of the filter element must be ensured. At the same time, the filter element itself should contain no metallic elements so that it can be thermally disposed of without problems.

One object of the invention is to provide a filter element with a reliable sealing action between the area of the unfiltered medium and the area of the filtered medium wherein the filter element, in particular in case of frequent exchange of the filter element, ensures a reliable installation in a housing.

A further object of the invention is to provide a filter system for receiving such an exchangeable filter element that provides a reliable sealing action and reliable installation.

SUMMARY OF THE INVENTION

In accordance with the present invention, this is achieved by a filter element and a filter system wherein the filter element comprises a filter body having a concentric shape about a longitudinal axis, a first open or closed end disk positioned at a first end face and a second end disk that is positioned at the opposite end face, as well as a support tube concentrically arranged about the longitudinal axis and extending in longitudinal direction between the first and second end disks, wherein at least one of the end disks has one or several support knobs which are arranged in a circular arrangement about the longitudinal axis and extend axially outwardly and, upon installation in a housing for receiving the filter element, fold outwardly in radial direction as they are contacting an inner cover contour of the housing and are axially and radially supported on the housing.

In contrast to the prior art where only support knobs are known which either deform axially or deform radially in inward direction, the support knobs have the property that the filter element, because of the supporting action in radial and axial directions, is secured safely in its position even when the housing is subjected to strong vibrations. The deliberate strong radial deformation component of the support knobs enables a very good centering action of the filter element. Also, by bending the support knobs outwardly in radial direction, tangential forces are generated that produce greater stiffness and restoring forces. This is in particular beneficial for larger and thus heavier air filter elements particularly in the field of construction machinery or agricultural machinery and optimizes also multiple installation and removal of the filter element during servicing.

When using such a filter element in the field of construction machinery or agricultural machinery, loading of the filter with dust and dirt particles is very high so that the weight of a loaded filter element may increase by several kilograms. The filter element as well as the corresponding filter system must therefore be designed to be appropriately robust.

In a beneficial embodiment, one or several support knobs can be arranged such that upon installation in the housing they can mesh with rib-shaped projections in the inner cover contour of the housing. With such a meshing action, a securing action against rotation of the filter element in the housing is provided so that the positional stability of the filter element in case of vibration excitation in operation is greatly enhanced. Conceivable is also a spacer knob that is arranged annularly about the longitudinal axis.

Advantageously, the second end disk in radial direction outside of the support knobs can have a relief groove so that folding of the support knobs upon mounting in the housing and closure of the cover is facilitated. The deformability of the support knobs can be favorably affected by the relief groove. The relief groove can be arranged concentrically to the longitudinal axis.

Expediently, the second end disk in radial direction can have outside of the support knobs and/or the relief groove a projection for supporting the support knobs which fold over outwardly in radial direction. When a support knob is folded during installation, the support knob experiences due to the contact on the projection a support action for compensating the axial force exerted by the filter element. In this way, the filter element can be clamped safely and stably. The projection acting as a stop prevents "over-deformation" (excessive deformation) of the support knobs; such excessive deformation might cause buckling and complete loss of restoring action. The projection can be designed e.g. as a ring concentric to the longitudinal axis. It is also conceivable to divide the projection into segments that correspond positionally to the position of the support knobs.

In an advantageous embodiment, the second end disk can be designed as one piece, preferably monolithic, with the support tube of the filter element. Such a configuration provides safe installation as well as, as much as possible, a stable behavior in operation because the end disk and the support tube as a supporting element of the entire filter element cannot become detached from each other even under strong vibration excitation.

In a further advantageous embodiment, the second end disk in the area between the filter body and the support knobs can have a reinforcement plate or a reinforcement ring. Such a stabilizing element on the end disk which, in contrast to the end disk that is usually made of soft plastic material, is made of hard plastic material or even metal can contribute decisively to the stability of the entire filter element. This is particularly important in filter elements for use in the field of construction machinery or agricultural machinery where appropriately large and heavy filter elements are required. Such a reinforcement plate or reinforcement ring can be embedded, for example, into the end disk.

A further stabilizing measure can reside in the support tube at both ends having an annular attachment with an L-shaped cross-section in order to distribute spatially an axial force introduction into the first and the second end disks. This attachment can also be made of a mechanically harder material than the material of the end disk in order to be able to absorb or compensate even greater forces, possibly occurring when clamping the filter element during assembly and to distribute them spatially onto a larger mounting surface.

Advantageously, the second end disk, like the first end disk, can be comprised of polyurethane foam or an elastomer. Of course, there is also the possibility of producing the end disk of several plastic components in order to ensure in this way an optimal deformability across a large temperature range as it may occur in practice. Accordingly, thermoplastic synthetic materials are not excluded. Both end disks can be fused (welded) with the filter body or glued thereto in order to effect a stable connection.

Expediently, the first end disk can have a radial seal relative to the housing. This has the advantage that, in addition to an excellent sealing action and thus safe filtering action, a doubled radial guiding action of the filter element in the housing is effected by means of the radial sealing action as well as the radial clamping action of the support knobs at the cover so that a very stable securing action of the filter element in the housing is provided.

In an expedient configuration, the filter body can be folded in a zigzag shape, can be embodied to be of an annularly closed configuration, and can be comprised of paper, of paper reinforced with plastic fibers, and/or of paper that is coated with plastic. The use of such materials as a filter medium provides a very economic possibility for realizing such a filter element. At the same time, the described shape provides a stable arrangement so that a self-supporting configuration of the filter body and thus beneficial mounting properties are provided.

Expediently, the filter element can be designed as an air filter, in particular as an air filter of an internal combustion engine. Safe operation of internal combustion engines is based inter alia on a safe and beneficial filtering of the intake air for combustion. The described filter element provides an economic possibility for this purpose.

Advantageous is also the use of the filter element as a particulate filter, in particular as an oil filter or fuel filter of an internal combustion engine. Here, safe installation and economic exchangeability or replacement of the described filter element are also of decisive importance.

According to a further aspect, the invention concerns a filter system with a filter element. The filter system comprises a housing which is substantially concentrically embodied about a longitudinal axis; a cover that is closing off the housing and that is also concentrically designed about the longitudinal axis and is provided on its inner side with an inner cover contour so that the support knobs of the second end disk of the filter element, contacting the cover contour, fold in radial direction outwardly, and/or has rib-shaped projections with which the support knobs can mesh; an inlet arranged at the housing and/or at the cover for supply of the medium to be filtered, in particular air; wherein on the housing concentric to the longitudinal axis an outlet for discharging the filtered medium is provided; wherein on the housing in the area of the outlet a sealing contour is provided which corresponds with the radial seal of the first end disk of the filter element; wherein the filter element is exchangeably arranged in the housing of the filter system. The important advantage of such a filter system resides in this context in the safe and stable installation of the filter element as well as in a very economic exchangeability of the filter element in a service situation. In particular for a short service life, as is the case in the field of agricultural or construction machinery, quick exchangeability is of great importance.

The cover contour has preferably a truncated cone structure that projects into the interior of the housing. The truncated cone structure can project from a planar base surface of the cover or can be formed by the radially inwardly positioned part of an annular circumferentially extending groove. The flank of the truncated cone structure can also be concavely rounded. The cover contour in the form of the groove or of the truncated cone structure is preferably formed with a flat angle. Flat in this context can mean that the surface in the direction of the central axis into the housing interior is positioned at an angle of less than 45°, preferably less than 30°, in particular preferred less than, or equal to, approximately 20°. The support knobs are arranged preferably such that they can be contacted with the flank of the truncated cone structure or the radially inwardly positioned side of the annular circumferentially extending groove and, supported by the angle of the inner side of the groove or of the flank of the truncated cone structure, can be folded in radial direction outwardly.

In a preferred embodiment, rib-shaped projections are provided on the inner cover contour. They extend preferably radially and are arranged in a regular arrangement in a circular shape on the cover contour or in the annular circumferentially extending groove or on the flank of the flat truncated cone structure. This has the advantage that the support knobs of a second end disk of the filter element can deform with positive fit about the ribs when they are contacting the cover contour so that in particular a meshing positive fit is provided. In this way, the filter element can be secured against rotation in operation even in case of possibly occurring vibration excitation.

Advantageously, in the area of the inlet of the filter system a cyclone separator can be provided and a dirt outlet can be provided on the housing or on the cover. This cyclone separator is comprised of a guiding geometry that causes the medium to be filtered to rotate. Due to this rotation the dirt is concentrated in the area of the housing wall and is discharged at a suitable location by means of a dirt outlet.

Due to the preseparation of most of the dirt from the air to be filtered, the service life of the actual filter element can be decisively prolonged.

According to a further embodiment of the invention, a secondary element can be arranged in the interior of the filter element. The secondary element that can be comprised of a support structure that is covered with a permeable filter medium, for example, a nonwoven, has the task of keeping closed the outlet of the filter system upon exchange of the filter element so that no dirt can penetrate into this area while the filter element is cleaned or replaced. In a preferred embodiment, the secondary element is connected by a screw connection with the housing and is provided with a seal relative to the housing.

Expedient embodiments and advantages of the invention result from the claims, the description, and the drawings.

BRIEF DESCRIPTION OF THE DRAWING

Further advantages result from the following description. In the drawings, embodiments of the invention are illustrated. The drawings, the description, and the claims contain numerous features in combination. A person of skill in the art will consider the features expediently also individually and combine them to other meaningful combinations.

In the Figures, same or functionally the same components are identified with same reference characters. The Figures show only exemplary embodiments and are not to be understood as limiting the invention.

DESCRIPTION OF THE PREFERRED EMBODIMENTS

Figure 1:
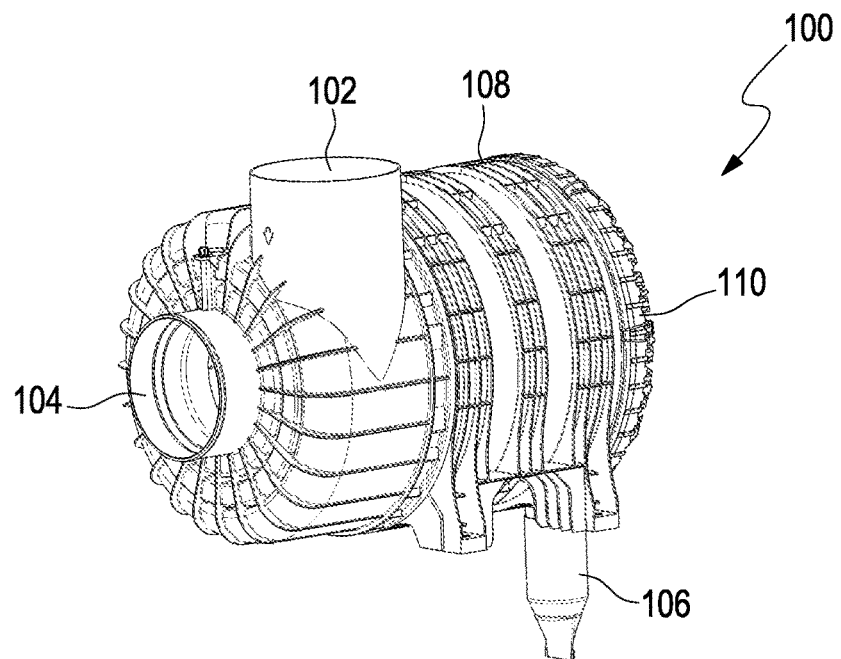
FIG. 1 shows in a perspective view a filter system according to an embodiment of the invention with tangential inlet, central outlet, and dirt outlet at the bottom.

FIG. 1 shows in a perspective view a filter system 100 according to an embodiment of the invention with tangential inlet 102, central outlet 104 at an end face of the housing, and a dirt outlet 106 at the bottom. Illustrated is a round filter configuration comprised of a housing 108 that is closed off by a cover 110, for example, a screw-on closure or a bayonet coupling closure.

When using the invention as an air filter system, dust-laden air flows in through inlet 102 that is tangentially arranged relative to the filter element mounted in the housing interior so that the air in the interior of the housing 108 is caused to rotate due to an incoming flow protector at the filter element. Filter element and incoming flow protector are not illustrated in the drawing. Due to the cyclone effect that is caused by the rotational movement of the air, centrifugal forces act on the dust particles of the incoming air so that the dust particles are separated partially at the housing wall and can be discharged from the filter system 100 via the dirt outlet 106. In this way, the filter element itself is loaded less and the service life of the filter element is increased. The purified air can then be discharged through the central outlet 104 from the housing 108.

Figure 2:
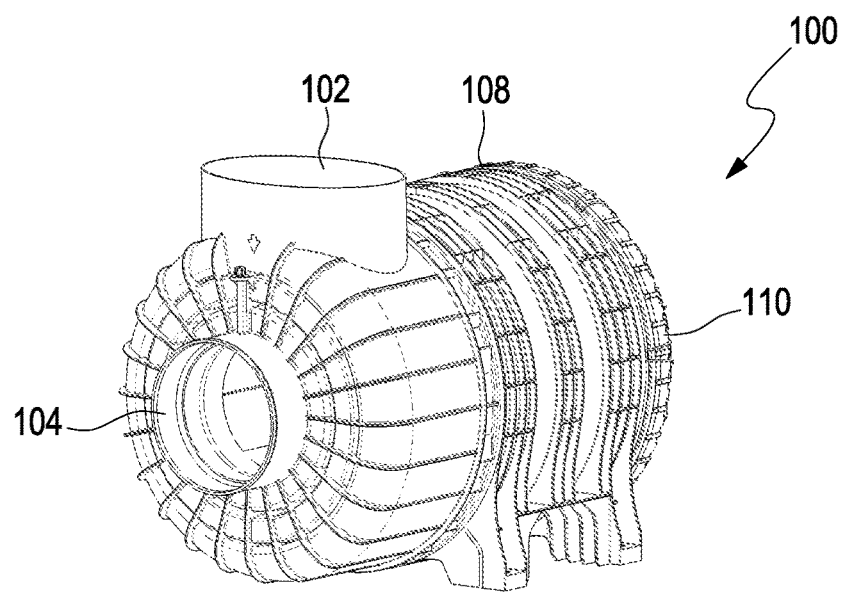
FIG. 2 shows in a perspective view a filter system according to an embodiment of the invention with radial inlet and central outlet.

FIG. 2 shows a perspective view of a filter system 100 according to an embodiment of the invention with inlet 102 at the cover and central outlet 104. Illustrated is also a round filter configuration that is comprised of a housing 108 closed off by cover 110. The inlet through which the dust-laden air flows into the housing is arranged in this case centrally above the filter element arranged in the interior. The outlet 104 through which the purified air can flow out is also centrally arranged, as also shown in FIG. 1.

Such filter systems as illustrated in FIGS. 1 and 2 are usually employed in the field of construction machinery and agricultural machinery. They are characterized by great robustness and have, due to the high dust load, a short service life. A filter system 100 with loaded filter element must be able to tolerate a weight increase of 10 kg or more.

Figure 3:
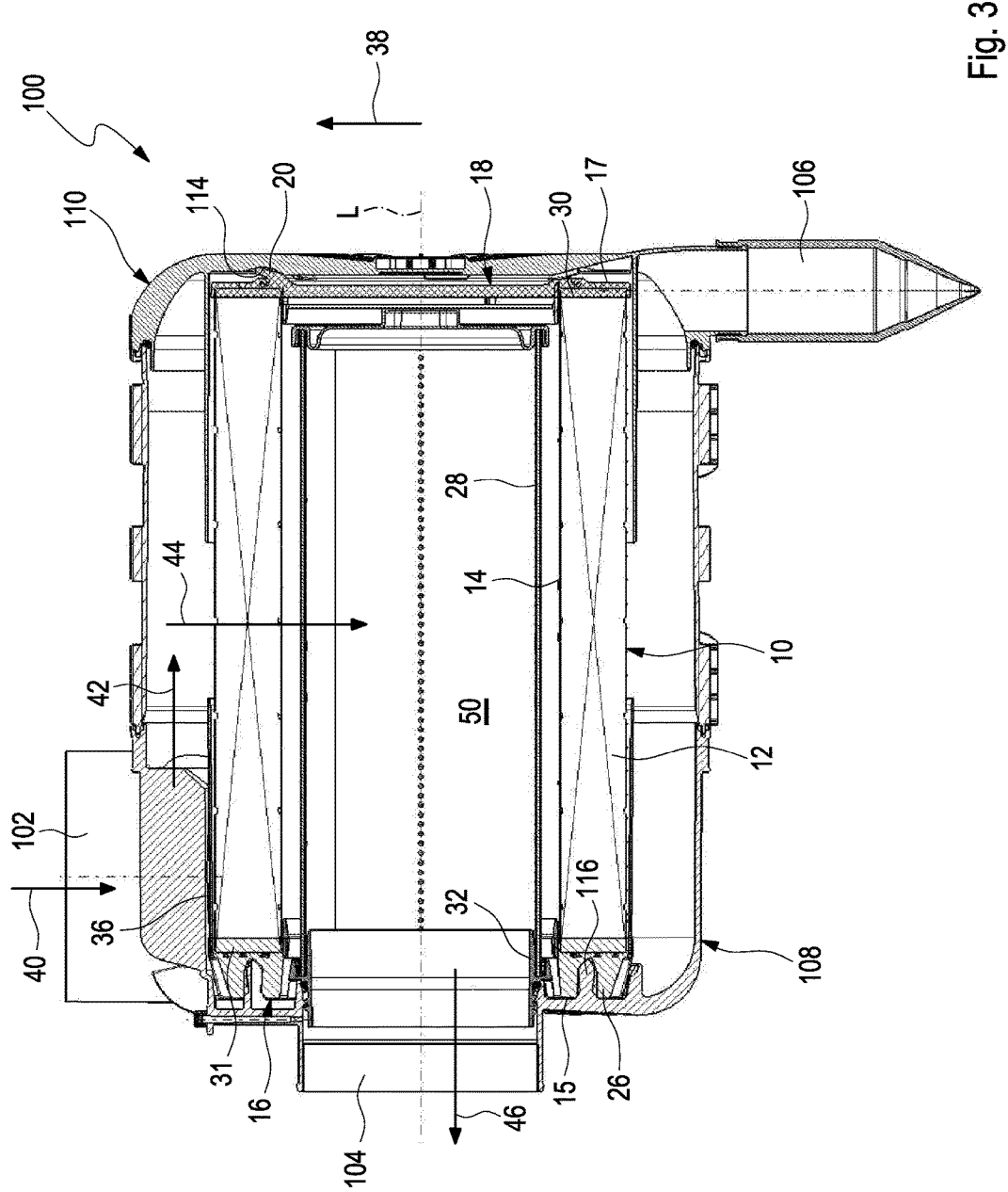
FIG. 3 is a longitudinal section view of the filter system according to an embodiment of the invention with tangential inlet, central outlet, and dirt outlet at the bottom.

In FIG. 3, a longitudinal section of the filter system 100 according to an embodiment with tangential inlet 102, central outlet 104, and dirt outlet 106 at the bottom is illustrated. The housing 108 of the filter system 100 is closed off with a cover 110. A filter element 10 that is comprised of a support tube 14 arranged concentrically relative to longitudinal axis L and a filter body 12 is closed off at the two opposed end faces 15, 17 with a first end disk and a second end disk 16, 18 that may be embodied, for example, of polyurethane foam or an elastomer. Second end disk 18 and support tube 14 of the filter element 10 may be configured monolithically with each other.

The filter body 12 can be folded, for example, in a zigzag shape, can be embodied to be of a closed annular shape, and can be comprised of a filter medium such as paper, paper reinforced with plastic fibers, and/or paper coated with plastic material.

The second end disk 18 whose stability is increased by a reinforcement plate 30 has segment-shaped interrupted support knobs 20 which radially outwardly extending are arranged circularly about the longitudinal axis L and, upon mounting of the filter element in the housing 108 that is provided for housing the filter element, come to rest against an inner cover contour 114 of the cover 110 and fold or bend in radial direction 38 outwardly and, in this way, are supported axially as well as radially on the housing 108. On the opposite end face 15 of the filter element 10, a radial seal 26 is provided on the first end disk 16 whose stability is increased by a reinforcement ring 31. By means of the seal 26, the filter element 10 is supported by a sealing contour 116 on the housing 108 in radial direction and seals the unfiltered air chamber relative to the filtered air chamber. The filter element 10 is thus axially as well as twice radially clamped relative to the housing 108.

Dust-laden air can flow in through the inlet 102 in the direction of arrow 40; in this case, the inlet 102 is a tangential inlet and enables a cyclone operation by means of the rotational movement of the air caused by the cyclone separator 36. Dust particles can be deposited at the inner housing wall, due to the partial preseparation caused by the rotational movement, and can be discharged from the filter system 100 downwardly by the force of gravity through the dirt outlet 106, when the filter housing 108 is installed in horizontal position. In operation, after partial separation of the dirt particles, the air flows through the filter body 12 in the direction of arrows 42, 44 into the interior 50 of the filter element. Dust particles are retained in the filter medium beginning at a certain particle size that depends on the filter medium. Depending on the dust introduction, the filter element 10 must therefore be exchanged after a certain operating time.

Through the outlet 104, the filtered air flows out in the direction of arrow 46. In the interior 50 of the filter element 10, a secondary element 28 is mounted which is substantially comprised of a supporting structure with a relatively permeable filter medium, for example, a nonwoven. When exchanging the filter element 10, the secondary element 28 remains in the housing 108 for protection of the downstream air guiding manifold, for example, of an internal combustion engine, against penetration of dust particles and other objects. The secondary element 28 is screwed in fixedly with a screw-on part 32 on the outlet-side part of the housing 108.

The filter element 10 can be designed as an air filter, in particular an air filter of an internal combustion engine. However, its use as a diesel particulate filter is conceivable also in a similar configuration.

Figure 4:
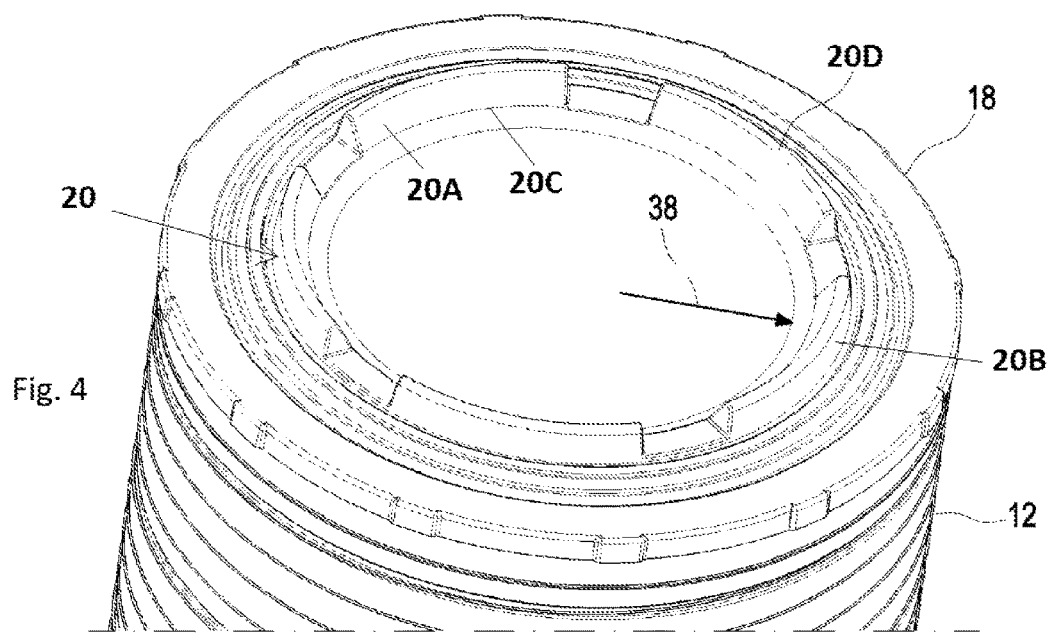
FIG. 4 is a perspective partial view of the filter element according to an embodiment of the invention with second end disk and support knobs.

FIG. 4 shows a perspective partial view of a filter element 10 according to an embodiment of the invention with second end disk 18 and support knobs 20. It can be seen that the second end disk 18 seals off the filter medium 12 as a closure of the filter medium 12. On the second end disk 18, interrupted segments as support knobs 20 are provided on a circular area; upon installation in a housing and support on an inner cover contour, the support knobs 20 can bend or fold in radial direction 38 outwardly. A radially inner face 20A of the support knobs 20, starting from the base 20C to the support knob tip 20D, slope radially outwardly at a first angle relative to a direction perpendicular to the axially outer surface of the second end disk 18, such that the support knobs 20 have a cross section that narrows starting from the base 20C to the support knob tip 20D. A radially outer face 20B of the support knobs 20 extends axially outwardly at a second angle relative to a direction perpendicular to the axially outer surface of the second end disk 18, the second angle<the first angle, such that the support knobs 20 are configured to elastically fold over on their radially outer face 20B in a radially outward direction.

Figure 5:
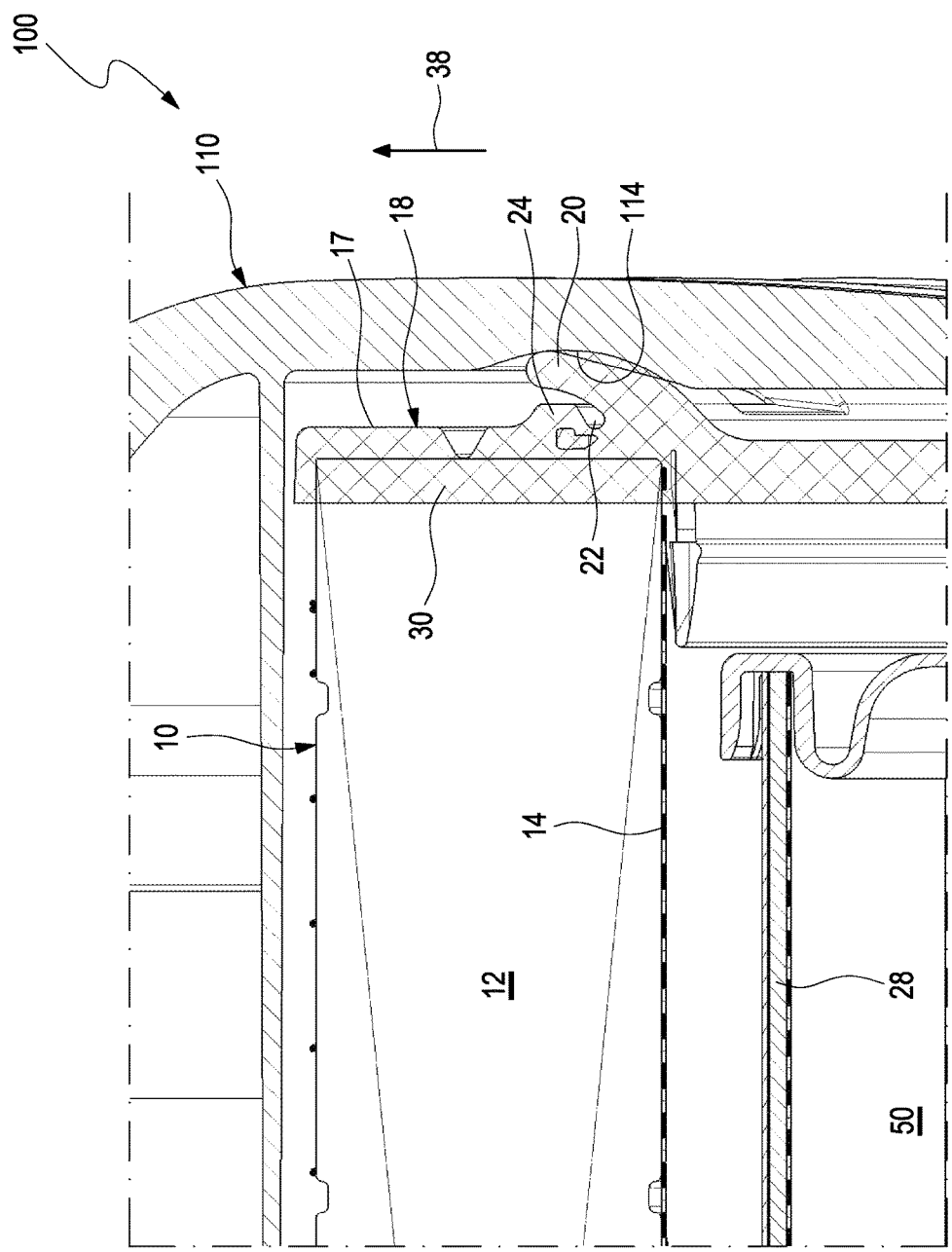
FIG. 5 is a partial cross-section view of the filter element according to an embodiment of the invention, illustrated in the mounted state, with radially outwardly folded support knobs.

In FIG. 5, a partial section view of a filter element 10 according to an embodiment of the invention in the mounted state with folded-over support knobs 20 is illustrated. In the section view, the folded-over support knobs 20 of the second end disk 18 can be seen which are pressed in radial direction 38 outwardly upon assembly by being pressed against the cover 110 and deflected by the inner cover contour 114. The folding action of the support knobs 20 is favored by the relief groove 22 which in radial direction is arranged external to the support knobs 20. The folded-over support knobs 20 can be supported on the projection 24 of the second end disk 18 so that a fixed clamping action in axial and radial directions of the end face 17 of the filter element 10 is enabled.

Also illustrated in FIG. 5 is the support tube 14 that provides a stiff structure to the filter element 10 as well as the filter body 12 which engages the second end disk 18. Also illustrated is a reinforcement disk 30 which is embedded in the second end disk. The projection 24 can be designed as a circumferentially extending ring which surrounds the circular area of the support knobs 20 or is segmented so as to match the segmented arrangement of the support knobs 20.

Figure 6:
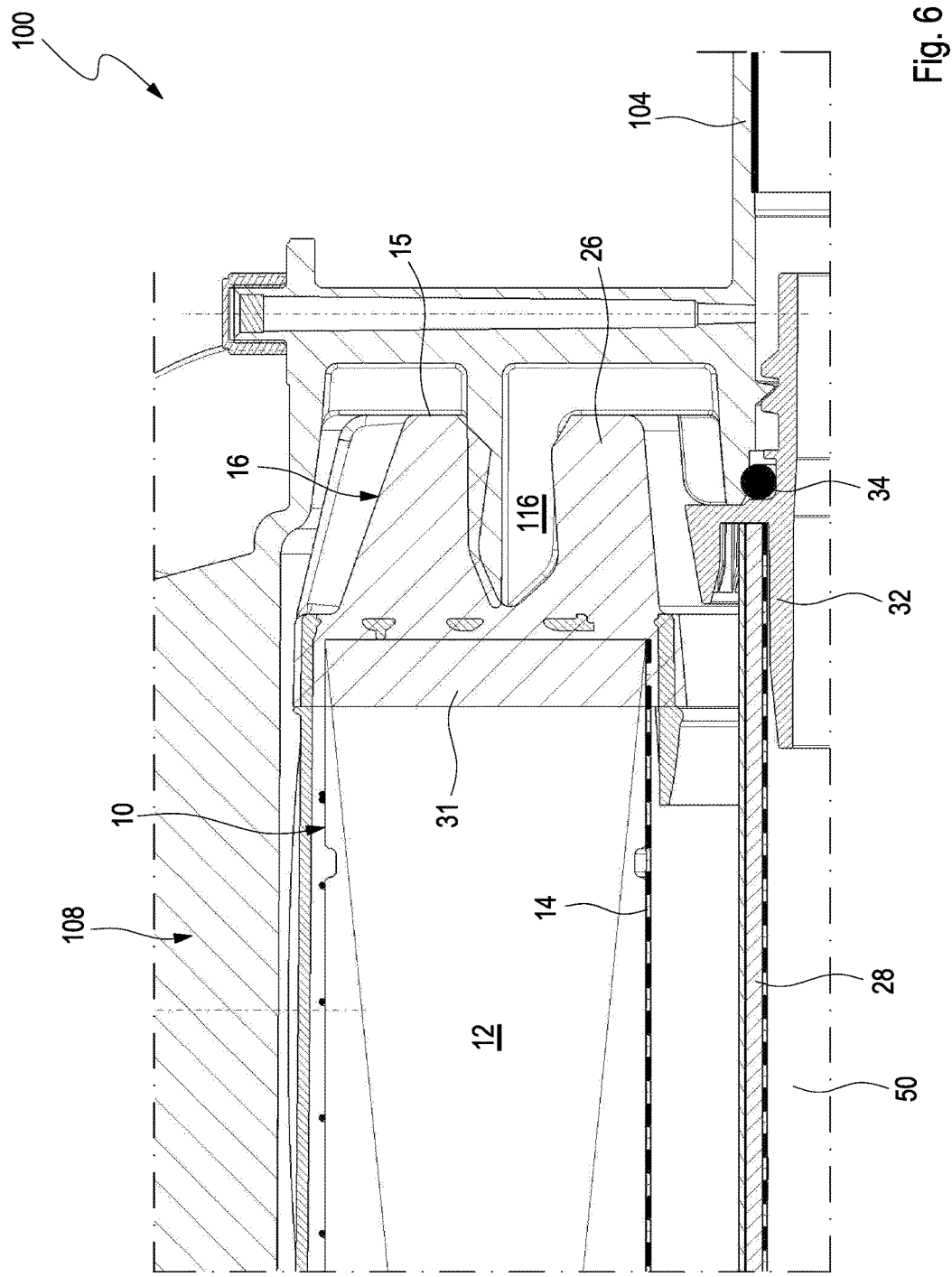
FIG. 6 is a partial section view of a filter element according to an embodiment of the invention, illustrated in the mounted state, with radial seal of a first end disk.

FIG. 6 shows a partial section view of a filter element 10 according to an embodiment of the invention illustrated in the mounted state with radial seal 26 of the first end disk 16. The filter element 10, a section of which is illustrated with support tube 14 and filter body 12, is closed off at the end face 15 by the first end disk 16 to which is applied a radial seal 26. With this radial seal 26 the filter element 10 is pressed into a sealing contour 116 of the housing 108 so that in this way a reliable radial sealing action is provided. Also illustrated is a secondary element 28 that is mounted in the interior 50 of the filter element 10 and, by means of a screw-on part 32, is screwed and fastened to the outlet-side end 104 of the housing 108. In case of exchange of the filter element 10, the secondary element 28 protects the downstream air guiding path, for example, into an internal combustion engine, from becoming soiled. The screw-on part 32 is sealed with an O-ring 34 relative to the housing 108.

Figure 7:
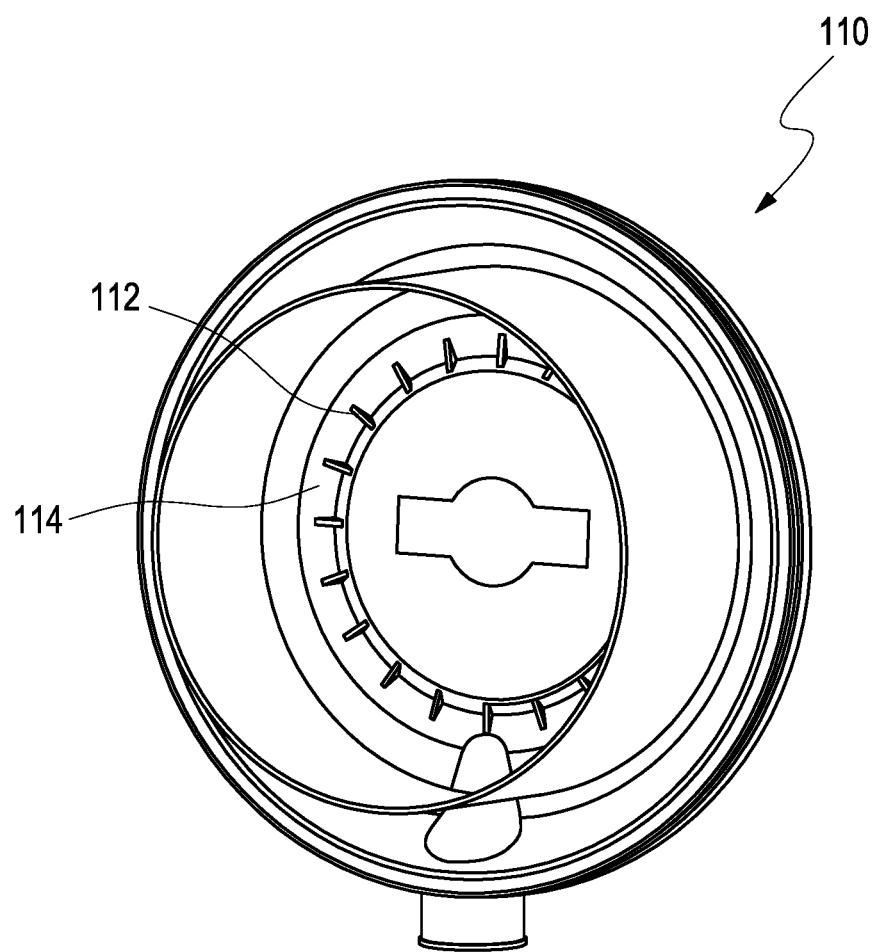
FIG. 7 is an inside view of a cover of a housing of a filter system with rib-shaped projections on the inner cover contour according to an embodiment of the invention.

FIG. 7 shows the inner view of a cover 110 of a housing of a filter system with rib-shaped projections 112 on the inner cover contour 114 according to an embodiment of the invention. By meshing with the support knobs of a second end disk of a filter element, the rib-shaped projections can secure the filter element against rotation in operation even in case of a possible vibration excitation.

Figure 8:
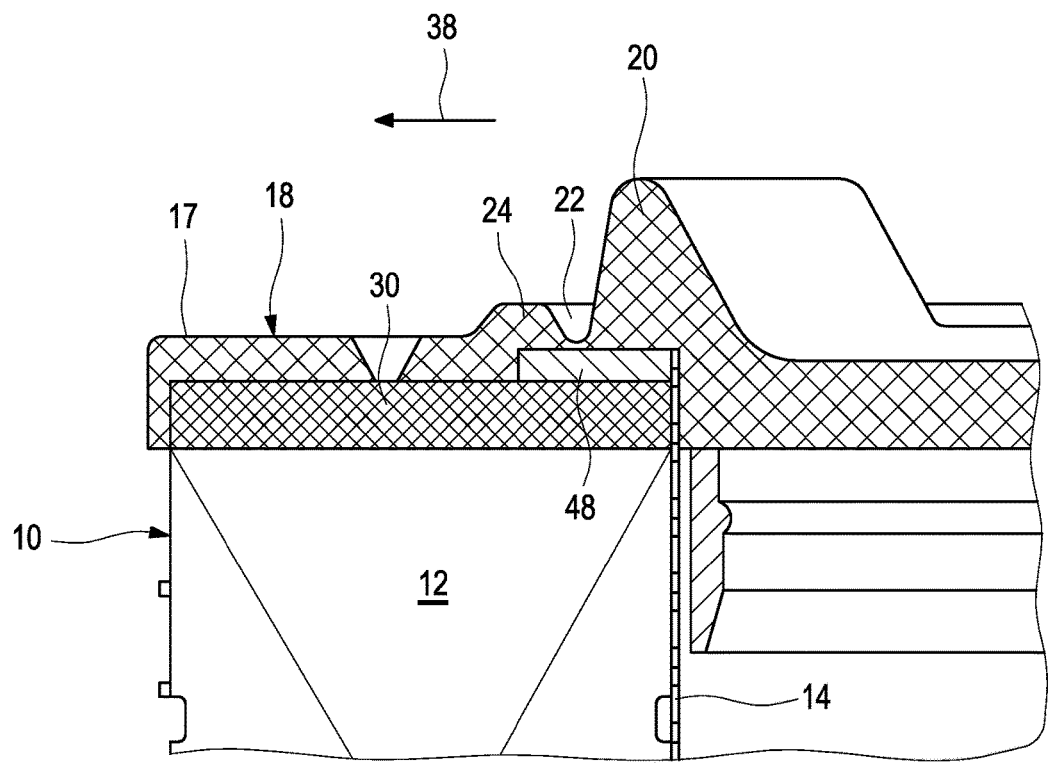
FIG. 8 shows a section view of a second end disk of a filter element according to an embodiment of the invention.

FIG. 8 shows a section of a second end disk 18 of a filter element 10 according to an embodiment of the invention in the not yet clamped state. The second end disk 18 closes off the filter element, comprised of filter body 12 and support tube 14, at an end face. A support knob 20 of the second end disk 18 is illustrated in the not yet clamped state. Clearly shown are also a relief groove 22 as well as a projection 24. The relief groove 22 facilitates folding over of the support knobs 20 in radial direction outwardly wherein however the support knob 20 can be supported in turn on the projection 24. In this way, a fixed axial clamping action of the filter element 10 is enabled. The support tube 14 has an annular attachment or projection 48 with L-shaped cross-section in order to spatially distribute an axial force introduction into the second end disk 18. The same principle of force distribution is also conceivable at the other end of the support tube 14 with the first end disk 16.

While specific embodiments of the invention have been shown and described in detail to illustrate the inventive principles, it will be understood that the invention may be embodied otherwise without departing from such principles.

What is claimed is:

1. A filter element comprising:
a filter body having a longitudinal axis and a concentric shape relative to the longitudinal axis, the longitudinal axis defining an axial direction,
the filter body having a filter medium, the filter body having a first axial end face and an opposing second axial end face;
a first open or closed end disk arranged at the first end face;
a second end disk arranged at the second end face;
a support tube arranged concentric to the longitudinal axis, the support tube is a cylinder having a first radius, the cylinder at the first radius extending from between the first end disk to the second end disk;
wherein at least one of the first and second end disks comprises a plurality of circumferentially spaced apart support knobs having a base arranged on an axially outer surface of the end disk, the plurality of circumferentially spaced apart support knobs arranged in a circular arrangement on a circle having the radius of the of the cylinder and concentric to the longitudinal axis, the plurality of circumferentially spaced apart support knobs extending in axial direction outwardly away to a support knob tip;

wherein the plurality of circumferentially spaced apart support knobs are configured and adapted for directly engaging against and elastically folding over in a radially outward direction against a radial flank of a projecting truncated cone formed on the interior of a housing into which the filter element is installable, the folded plurality of circumferentially spaced apart support knobs operable to support the filter element axially and radially in the housing;

wherein a radially inner face of the plurality of circumferentially spaced apart support knobs, starting from the base to the support knob tip, slopes radially outwardly at a first angle relative to a direction perpendicular to the axially outer surface of the end disk, such that the plurality of circumferentially spaced apart support knobs have a cross section that narrows starting from the base to the support knob tip;

wherein a radially outer face of the of the plurality of circumferentially spaced apart support knobs extends axially outwardly at a second angle relative to the direction perpendicular to the axially outer surface of the end disk, the second angle<the first angle, such that the plurality of circumferentially spaced apart support knobs are configured to elastically fold over on their radially outer face in a radially outward direction;

wherein the support tube is aligned radially directly underneath and supported axially on the plurality of circumferentially spaced apart support knobs, such that the support tube distributes forces in an axial direction from the filter element onto an underside of the plurality of circumferentially spaced apart support knobs.

2. The filter element according to claim 1, wherein the first or second end disk end disk which has the one or several support knobs, additionally includes a relief groove formed in the respective end disk, the relief groove arranged in radial direction outwardly from a radially outer face of the one or several support knobs.

3. The filter element according to claim 2, wherein the relief groove is arranged at the radially outer face of the one or several support knobs.

4. The filter element according to claim 1, wherein the support tube at the plurality of circumferentially spaced apart support knobs has an L-shaped cross section,
 a first leg of the L-shaped cross section formed by a tubular body of the support tube;
 a second leg of the L-shaped cross-section formed by a radially outwardly extending annular leg of the support tube, the annular leg arranged on an axial end of the tubular body.

5. The filter element according to claim 1, wherein the second end disk and the support tube together are formed as a monolithic component.

6. The filter element according to claim 1, wherein the second end disk is comprised of a polyurethane foam or an elastomer.

7. The filter element according to claim 1, wherein the first end disk has a radial seal that seals relative to the housing.

8. The filter element according to claim 1, wherein the filter medium is selected from the group consisting of paper, paper reinforced with plastic fibers, and plastic-coated paper, and combinations thereof;
wherein the filter body has a folded zigzag shape and is annularly closed.

9. The filter element according to claim 1, wherein the one or several support knobs are several support knobs arranged in a circular arrangement with gaps between adjacent support knobs;
wherein the gaps between the adjacent support knobs in the circular arrangement are uniform.

10. The filter element according to claim 1, wherein the one or several support knobs are several support knobs arranged in a circular arrangement with gaps between adjacent support knobs,
wherein the gaps between the adjacent support knobs in the circular arrangement are non-uniform.

11. The filter element according to claim 1, wherein the one or several support knobs are arranged on the second end disk and the second end disk is of a closed configuration, closing over an interior of the filter body and the support tube.

12. The filter element according to claim 1, wherein the one or several support knobs are arranged at and secured directly onto the support tube of the filter element.

13. The filter element according to claim 1 is an air filter.

14. A filter system comprising:
 a housing having a longitudinal axis and a substantially concentric shape relative to the longitudinal axis;
 a filter element disposed exchangeably in the housing, the filter element comprising:
  a filter body having a longitudinal axis and a concentric shape relative to the longitudinal axis, the longitudinal axis defining an axial direction,
  the filter body having a filter medium, the filter body having a first axial end face and an opposing second axial end face;
  a first open or closed end disk arranged at the first end face;
  a second end disk arranged at the second end face;
  a support tube arranged concentric to the longitudinal axis, the support tube is a cylinder having a first radius, the cylinder at the first radius extending from the first end disk to the second end disk;
  wherein at least one of the first and second end disks comprises a plurality of circumferentially spaced apart support knobs arranged in a circular arrangement on a circle having the radius of the of the cylinder and concentric to the longitudinal axis, the plurality of circumferentially spaced apart support knobs extending in axial direction outwardly away;
  wherein the plurality of circumferentially spaced apart support knobs are configured and adapted for directly engaging against and elastically folding over in a radially outward direction against a radial flank of a projecting truncated cone formed on the interior of a housing into which the filter element is installable, the folded plurality of circumferentially spaced apart support knobs operable to support the filter element axially and radially in the housing;
  wherein the support tube is aligned radially directly underneath and supported axially on the plurality of circumferentially spaced apart support knobs, such that the support tube distributes forces in an axial direction from the filter element onto an underside of the plurality of circumferentially spaced apart support knobs;

a cover closing off the housing and concentrically configured relative to the longitudinal axis, the cover having a truncated cone structure that projects into the interior of the housing;

wherein the truncated cone structure has a radially outer flank engaging directly against and folding the plurality of circumferentially spaced apart support knobs of the filter element so that the plurality of circumferentially spaced apart support knobs are folded over in radial direction outwardly;

an inlet arranged on the housing and/or the cover, wherein the inlet supplies a medium to be filtered to the filter element;

an outlet that discharges the medium that has been filtered, wherein the outlet is arranged on the housing concentric to the longitudinal axis;

wherein the housing in the area of the outlet is provided with a sealing contour that corresponds with a radial seal of the first end disk of the filter element.

15. The filter system according to claim 14, further comprising:

a cyclone separator that is disposed in the area of the inlet and further comprising a dirt outlet disposed on the housing or on the cover.

16. The filter system according to claim 14, further comprising a secondary element disposed in an interior of the filter element, wherein the secondary element is connected to the housing such that the secondary element remains in the housing when the filter element is exchanged.

17. The filter system according to claim 14, wherein the support tube at the plurality of circumferentially spaced apart support knobs has an L-shaped cross section, a first leg of the L-shaped cross section formed by a tubular body of the support tube;

a second leg of the L-shaped cross-section formed by a radially outwardly extending annular leg of the support tube, the annular leg arranged on an axial end of the tubular body.

\* \* \* \* \*